United States Patent
Corcos et al.

(10) Patent No.: US 9,945,934 B2
(45) Date of Patent: *Apr. 17, 2018

(54) RADAR INTEGRATION WITH HANDHELD ELECTRONIC DEVICES

(71) Applicant: International Business Machines Corporation, Armonk, NY (US)

(72) Inventors: Dan Corcos, Nesher (IL); Danny Elad, Moshav Liman (IL)

(73) Assignee: International Business Machines Corporation, Armonk, NY (US)

(*) Notice: Subject to any disclaimer, the term of this patent is extended or adjusted under 35 U.S.C. 154(b) by 357 days.

This patent is subject to a terminal disclaimer.

(21) Appl. No.: 14/641,485

(22) Filed: Mar. 9, 2015

(65) Prior Publication Data
US 2015/0226837 A1 Aug. 13, 2015

Related U.S. Application Data

(63) Continuation of application No. 14/141,318, filed on Dec. 26, 2013, now Pat. No. 9,547,070.

(51) Int. Cl.
| | |
|---|---|
| *G01S 13/06* | (2006.01) |
| *G01S 7/35* | (2006.01) |
| *G01S 13/02* | (2006.01) |
| *G01S 7/40* | (2006.01) |
| *G01S 13/34* | (2006.01) |
| *G01S 13/88* | (2006.01) |
| *H01Q 3/34* | (2006.01) |

(Continued)

(52) U.S. Cl.
CPC .............. *G01S 7/35* (2013.01); *G01S 7/4056* (2013.01); *G01S 13/02* (2013.01); *G01S 13/34* (2013.01); *G01S 13/88* (2013.01); *H01Q 1/243* (2013.01); *H01Q 3/34* (2013.01); *H01Q 21/065* (2013.01); *G01S 2007/027* (2013.01); *G01S 2013/0245* (2013.01)

(58) Field of Classification Search
CPC .............................. G01S 13/26; G01S 13/781
USPC ........................................................ 342/43
See application file for complete search history.

(56) References Cited

U.S. PATENT DOCUMENTS

| | | | |
|---|---|---|---|
| 7,301,494 B2 | 11/2007 | Waters | |
| 8,519,885 B2* | 8/2013 | Ash, Jr. ................. | H01Q 1/243 342/134 |

(Continued)

FOREIGN PATENT DOCUMENTS

| | | |
|---|---|---|
| DE | 102005048013 | 4/2007 |
| WO | 2012149270 | 11/2012 |
| WO | 2012153227 | 11/2012 |

OTHER PUBLICATIONS

IBM, "Mobile Device System for Detecting Oncoming Obstacles and Overlaying a Radar Display on Mobile Device Screen", An IP.com Prior Art Database Technical Disclosure, Nov. 19, 2012.

(Continued)

*Primary Examiner* — Timothy A Brainard (57) ABSTRACT

A device comprising: a housing mountable on a back surface of a handheld electronic device; a radar coupled with the housing, the radar comprising: (a) a receiver unit comprising at least one receiving antenna element; (b) a transmitter unit comprising at least one transmitting antenna element; an integrated circuit (IC) module; and an interface unit configured to operatively couple the radar with the handheld electronic device.

7 Claims, 5 Drawing Sheets

(51) Int. Cl.
*H01Q 1/24* (2006.01)
*H01Q 21/06* (2006.01)
*G01S 7/02* (2006.01)

(56) References Cited

U.S. PATENT DOCUMENTS

| | | | |
|---|---|---|---|
| 9,547,070 B2* | 1/2017 | Corcos | G01S 13/34 |
| 2008/0117094 A1 | 5/2008 | Lindoff et al. | |
| 2011/0148686 A1* | 6/2011 | Cole | G01S 13/32 |
| | | | 342/22 |
| 2013/0088382 A1* | 4/2013 | Lee | G01S 7/4026 |
| | | | 342/174 |
| 2013/0203464 A1 | 8/2013 | Thiruppathi | |
| 2014/0368442 A1* | 12/2014 | Vahtola | G06F 3/013 |
| | | | 345/173 |

OTHER PUBLICATIONS

Adam Williams, "Fingernail-Sized Radar Chip Could Be Used in Future Smartphone's", Nov. 2012. Can be found at : http://www.gizmag.com/worlds-smallest-sized-radar-system/25152/.

* cited by examiner

RADAR INTEGRATION WITH HANDHELD ELECTRONIC DEVICES

CROSS-REFERENCE TO RELATED APPLICATIONS

This application is a continuation of U.S. patent application Ser. No. 14/141,318, filed Dec. 26, 2013, entitled "Radar Integration with Handheld Electronic Devices".

BACKGROUND

The present invention relates to the field of sensor integration with multi-function handheld electronic devices.

The number of sensors that are used on a daily basis is increasing with an ever-growing pace. Gyroscopes, cameras, thermometers and other small sensors are used for enhancing the senses or to simplify the interaction with the electronic devices that one may own.

Continuous-wave (CW) radar is a type of radar device where continuous-wave radio energy of a known stable frequency is transmitted and then received from reflecting objects. Frequency-modulated (FMCW) continuous-wave radar is a relatively short range measuring radar capable of determining distance, velocity and acceleration. The FMCW radar is commonly used as an altimeter to measure height during the landing procedure of aircrafts. It may be also used as early-warning radar and in proximity sensors and other applications.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a device comprising: a housing mountable on a back surface of a handheld electronic device; a Frequency-Modulated Continuous-Wave (FMCW) radar coupled with the housing, the FMCW radar comprising: (a) a receiver unit comprising at least one receiving antenna element, (b) a transmitter unit comprising at least one transmitting antenna element, (c) an integrated circuit (IC) module; and an interface unit configured to operatively couple the IC module with the handheld electronic device.

There is further provided, in accordance with an embodiment, a handheld electronic device comprising a phased-array Frequency-Modulated Continuous-Wave radar (FMCW), the phased-array FMCW comprising: a receiver unit comprising a plurality of receiving antenna elements; a transmitter unit comprising a plurality of transmitting antenna elements; and an integrated circuit (IC) module.

There is yet further provided, in accordance with an embodiment, a device comprising: a housing mountable on a back surface of a handheld electronic device; a step frequency radar coupled with the housing, the step frequency radar comprising: (a) a receiver unit comprising at least one receiving antenna element, (b) a transmitter unit comprising at least one transmitting antenna element, (c) an integrated circuit (IC) module; and an interface unit configured to operatively couple the IC module with the handheld electronic device.

In some embodiments, the FMCW radar is embedded in the housing.

In some embodiments, the interface unit is a wireless interface unit.

In some embodiments, the interface unit is a wired interface unit.

In some embodiments, the at least one receiving antenna element comprises a plurality of receiving antenna elements and the at least one transmitting antenna element comprises a plurality of transmitting antenna elements, and wherein when the housing is mounted on the handheld electronic device: the plurality of one transmitting antenna element are arranged in an array facing at least a first portion of the back surface of the handheld electronic device; and the plurality of receiving antenna elements are arranged in an array facing at least a second portion of the back surface of the handheld electronic device.

In some embodiments, the handheld electronic device is selected from the group consisting of: a smartphone and a tablet computer.

In some embodiments, the FMCW radar is configured to measure at least one variable selected from the group consisting of: distance, speed and acceleration of a target object with respect to the handheld electronic device.

In some embodiments, the FMCW radar is a phased-array FMCW radar.

In some embodiments, the handheld electronic device comprises an image sensor, and wherein the image sensor is configured to provide input for directing a beam transmitted by the transmitter unit.

In some embodiments, the plurality of transmitting antenna elements are arranged in an array facing at least a first portion of the back surface of the handheld electronic device; and the plurality of receiving antenna elements are arranged in an array facing at least a second portion of the back surface of the handheld electronic device.

In some embodiments, the handheld electronic device further comprises an image sensor, and wherein input from the image sensor is used to direct a beam transmitted by the transmitter unit.

In some embodiments, the phased-array FMCW radar is configured to measure distance, speed or acceleration or a combination thereof of a target object at a specific direction with respect to the handheld electronic device.

In some embodiments, the step frequency radar is embedded in the housing.

In some embodiments, the step frequency radar is configured to measure at least one variable selected from the group consisting of: distance, speed and acceleration of a target object with respect to the handheld electronic device.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Integration of a radar, such as FMCW, step frequency or a different radar with a handheld electronic device is disclosed herein. The radar may be integrated with a handheld electronic device as a part of an add-on cover device, to be mounted on the handheld electronic devices. Alternatively, the radar may be fully integrated in the handheld electronic device. Such integration may put the capabilities of the radar within reach of the crowd in a simple and ready to use manner. Furthermore, integration of a phased-array radar may provide a larger field-of-view, better focusing and as a result of that further applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
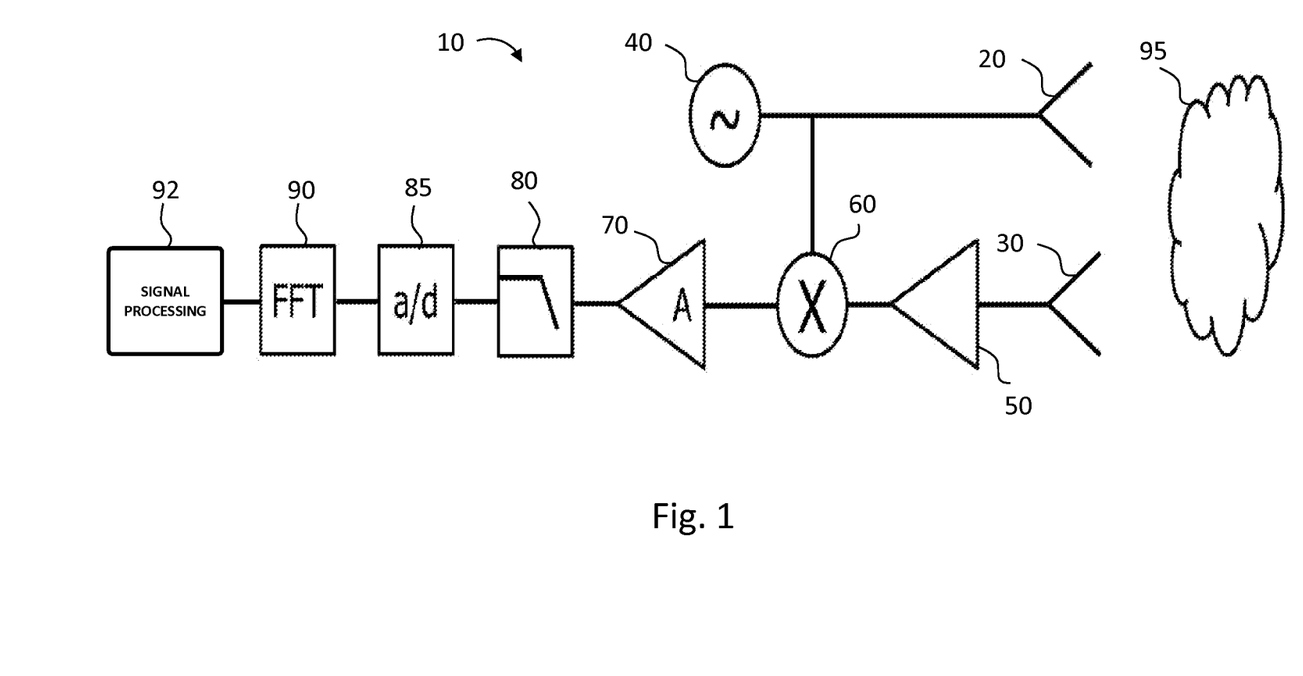
FIG. 1 shows a block diagram of a general design of an FMCW radar, constructed and operative in accordance with an embodiment of the disclosed technique.

FIG. 1 shows a functional block diagram of a general design suitable for FMCW or step frequency radar 10, constructed and operative in accordance with an embodiment of the disclosed technique. Radar 10 may include one or more of a transmitter 20, a receiver 30, a chirp or step frequency generator 40, a Low Noise Amplifier (LNA) 50, a mixer 60, a Variable Gain Amplifier (VGA) 70, an Anti-Aliasing (AA) filter 80, an Analog to Digital Converter (ADC) 85 and a Fast Fourier Transform (FFT) computing unit 90. The digital data is processed by a computer with one or more application-specific signal processing algorithms 92. Chirp or step frequency generator 40 may be operatively coupled with transmitter 20 and mixer 60. Receiver 30 may be operatively coupled with LNA 50. LNA 50 may be operatively coupled with mixer 60. Mixer 60 may be operatively coupled with VGA 70. VGA 70 may be operatively coupled with AA filter 80. AA filter 80 may be operatively coupled with ADC 85. ADC 85 may be operatively coupled with FFT computing unit 90 and/or with signal processing algorithms 92.

Chirp generator 40 may produce a saw-tooth signal which may be fed to transmitter 20 antenna and to mixer 60 in receiver 30 branch. The chirp may be either generated with a frequency multiplier chain that multiplies an external signal or a Voltage Controlled Oscillator (VCO) in a closed loop. Alternatively, a step frequency generator may be used by implementing a closed loop circuit. The signal reflected from a target 95 may be received by an antenna of receiver 30 and delivered to LNA 50. Mixer 60 may be then used for generating the "beat", which is the difference of the received signal's frequency and a reference frequency. The obtained signal may be then amplified with VGA 70, filtered for anti-aliasing purpose by AA filter 80, and digitized by ADC 85. The obtained digital samples may be processed with two FFT computations, performed by FFT computing unit 90, so that both the distance and the speed may be extracted from the beat samples. With a single FFT operation, a distance measurement may be obtained.

Figure 2:
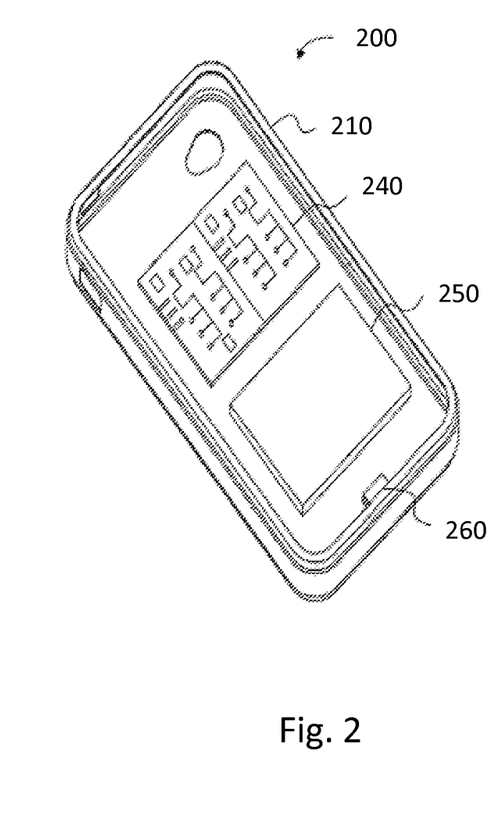
FIG. 2 shows an isometric view of an add-on cover device constructed and operative in accordance with an embodiment of the disclosed technique.
Figure 3:
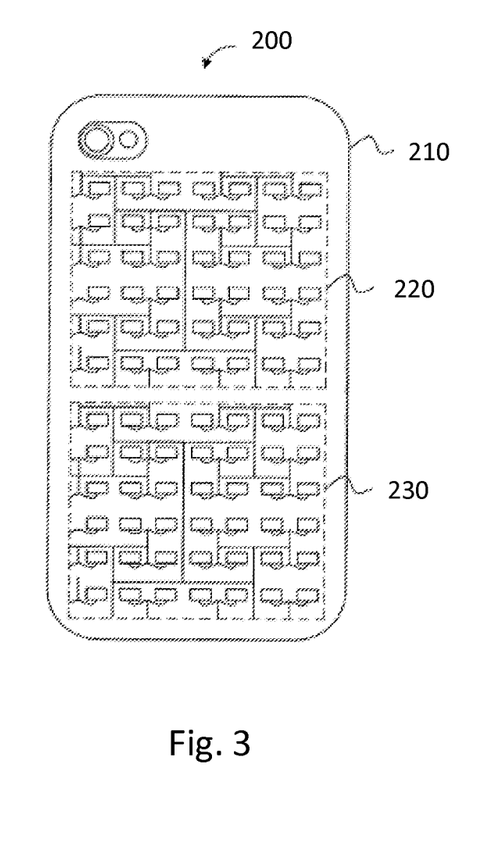
FIG. 3 shows a partially transparent rear view of the add-on cover device of FIG. 2, mounted on the back of a handheld electronic device.

Reference is now made to FIGS. 2 and 3. FIG. 2 shows an isometric view of an add-on cover device 200 constructed and operative in accordance with an embodiment of the disclosed technique. FIG. 3 shows an illustration of a partially transparent rear view of add-on cover device 200 mounted on the back of a handheld electronic device. Add-on cover device 200 may include a housing 210, a Frequency-Modulated Continuous-Wave (FMCW) radar or Step frequency radar (not shown) and an interface unit 260. Device 200 may further include an auxiliary battery 250. The radar may include a receiver antenna unit 220, a transmitter antenna unit 230 and an integrated Circuit module (IC) 240.

A receiver unit according to the disclosed technique includes at least one receiving antenna element. A transmitter unit according to the disclosed technique includes at least one transmitting antenna element The radar is coupled with housing 210. Receiver antenna unit 220 and transmitter antenna unit 230 are operatively coupled with IC module 240. IC module 240 is operatively coupled with interface unit 260 and with auxiliary battery 250. Housing 210 is configured to be mounted on a back surface of the handheld electronic device, such as a cellular phone. Housing 210 may include a rear wall (not indicated) configured to cover the rear portion of the handheld electronic device, as shown in FIG. 3, and four side walls (not indicated) configured to hold housing 210 on the handheld electronic device (as shown in FIG. 2). It should be noted that in FIG. 3 the rear wall of housing 200 is illustrated partially transparent in order to show receiver antenna unit 220 and transmitter antenna unit 230. Receiver antenna unit 220 and transmitter antenna unit 230 may be embedded in housing 210 or operatively coupled with it. Interface unit 260 is configured to operatively couple between the radar hardware components and the handheld electronic device.

Receiver antenna unit 220 includes a plurality of receiving antenna elements arranged in an array such that when housing 210 is mounted on the handheld electronic device, the array of plurality of receiving antenna elements faces an upper portion of the back surface of the handheld electronic device, as shown in FIG. 2. Transmitter antenna unit 230 includes a plurality of transmitting antenna elements arranged in an array such that when device 200 is mounted on the handheld electronic device, the array of plurality of transmitting antenna elements faces a lower portion of the back surface of the handheld electronic device, as shown in FIG. 2.

The FMCW or step frequency radar may be embedded in a housing according to the disclosed technique, for example, housing 210, as shown in FIGS. 2 and 3. The radar may be configured to measure variables such as distance, speed and/or acceleration of a target object with respect to the handheld electronic device. A user may direct the radar at a desired target object by pointing the transmitting antenna surface towards it. The radar may be directed at a desired target object also by software, if the phased array is implemented.

A transmitter (TX) unit of the radar according to the disclosed technique may include an external crystal oscillator, which may be used for generating a signal reference clock with a stable frequency that may be fed to a fractional N synthesizer. The synthesizer may be used for generating a chirp of frequency against time (for example in the form of a saw-tooth) or step frequency sequence. The fundamental frequency may be multiplied to the required millimeter wave band to be transmitted. A power amplifier (PA) may be used for raising a level of the transmitted signal. The transmitted signal may be distributed to all the TX antenna elements at once. The crystals frequency may be used as a reference clock for the digital components and ADC.

In accordance with the disclosed technique, an FMCW radar data may be generally obtained by radiating (i.e., by the transmitter unit) a special waveform, i.e., a chirp, towards a target object. The chirp may be generally shaped in a saw-tooth of frequency vs. time, which is periodically transmitted to the target object. The reflected waves may be received (i.e., by the receiver unit) with a variable delay, depending on the distance of the FMCW radar from the target object. The reflections may be subtracted from the original waveform using a direct conversion mixer, which produces a single frequency component (i.e., beat). The FMCW radar, thus, translates a distance into a frequency. A highly linear chirp may be used. The beat, whose frequency is lower than the chirp frequency, may be sampled with an Analog-to-Digital (A2D) converter and its frequency is converted to the corresponding distance with an FFT algorithm. Data processing algorithms, as known in the art, may be used for detecting position, speed and acceleration of the target object. In accordance with the disclosed technique, a step frequency radar data may be generally obtained by radiating (i.e., by the transmitter unit) a special waveform, i.e., a monotonic linear series of frequency levels, towards a target object. The waveform is periodically transmitted to the target object. The reflected waves may be received (i.e., by the receiver unit) with a variable phase, depending on the distance of the radar from the target object. The original waveform may also be shifted by a constant Intermediate Frequency (IF) frequency and injected into the LO port of the receiver mixer. The reflected wave from the object may be subtracted from the Local Oscillator (LO) signal, using a direct conversion mixer, which produces an IF signal. The step frequency radar, thus, translates a distance into a phase variation. The IF signal, whose frequency is lower than the transmitter frequency, may be sampled with an Analog-to-Digital (A2D) converter and its phase is converted to the corresponding distance with a FFT algorithm. Data processing algorithms, as known in the art, may be used for detecting position, speed and/or acceleration of the target object.

The FMCW or step frequency radar may be of various frequencies and/or frequency ranges and according to its desired functionality. For example, the FMCW radar may be of a frequency range of millimeter wave, such as 60 GHz and/or 76-81 GHz The FMCW radar may be of a wideband frequency range such as 5 GHz and above, if, for example, high depth resolution is desired.

Optionally, the FMCW or step frequency radar may be used for radar imaging, for example using the signal processing algorithms. The radar imaging may form a picture of a detected object by mapping the electromagnetic scattering coefficient onto a two-dimensional plane.

Generally, one or more receiving and transmitting antennas may be arranged in various manners with respect to the housing and therefore with respect to the handheld electronic device, when the housing is mounted on it. The one or more receiving and transmitting antennas may be, for example, embedded in a relatively outer portion of the rear wall of the housing as shown in FIG. 3.

Using a plurality of antenna elements arranged to extend on the rear side of the handheld electronic device (i.e., when the add-on cover device is mounted of the handheld electronic device) may allow for a large antenna, thus improving spatial resolution, but still thin handheld electronic device (as shown in FIG. 2). However, the one or more receiving and transmitting antennas may be arranged such that openings in a casing of the handheld electronic device (e.g., for a camera or a flash) are not blocked when the housing is mounted on the handheld electronic device.

A radar IC according to the disclosed technique may be a Silicon-Germanium (SiGe) chipset or a chipset of any other semiconductor technology. The chipset may be housed in a shallow socket and may be passivated by some insulating material with known dielectric properties. The IC module may be embedded in an inner portion of the rear wall of the housing as shown in FIG. 2.

An interface unit according to the disclosed technique may facilitate bidirectional communication between the radar hardware components and the handheld electronic device. The interface unit may use a Serial Peripheral Interface (SPI) bus to establish such a communication. The interface unit may facilitate a wired or a wireless communication. A wired interface unit may be, for example, a Universal Serial Bus (USB) data connector, such as interface unit 260, to be connected with a USB port of the handheld electronic device. Alternatively, the interface unit may include a wireless radio element to facilitate a wireless communication with the handheld electronic device using Bluetooth or Wi-Fi technologies.

In some embodiments of the disclosed technique, an auxiliary battery may be used, such as battery 250 of device 200, in order to avoid drainage of a battery of the handheld electronic device. The auxiliary battery may be utilized by the radar. The auxiliary battery may be embedded in the housing, as shown in FIG. 2.

The various components of an add-on cover device according to the disclosed technique may be arranged or integrated in various manners and not limited to the arrangements shown in FIGS. 2 and 3.

A handheld electronic device according to the disclosed technique may be of different types, for example, a smartphone or a tablet computer. An add-on cover device according to the disclosed technique may be configured to be compatible with different types of handheld electronic device or with different models of such types, e.g., smartphones of different manufacturers.

A processor of the handheld electronic device may be used to control the radar parameters according to instructions or input received from a user. The processor may be further used to process data obtained by the radar. Such operations may be facilitated by a dedicated software application. Such software application may generate a graphic user interface (GUI) through which the user may control the operation of the radar. For example, output of the radar may be processed by the processor and displayed graphically or in other known manners for the user on a display of the handheld electronic device. Furthermore, the data provided by the radar may be fused with other data obtained by the handheld electronic device, such as image of a target object obtained by an image sensor of the handheld electronic device. Thus, for example, a user may watch a target object which is scanned by the radar via the image sensor.

The housing may be made, for example, of rubber, plastic and/or a flexible multilayer substrate.

In some embodiments, the FMCW or step frequency radar may be a phased array radar. An add-on cover device including a phased array radar is generally similar to an add-on cover device including an FMCW or step frequency radar as shown in FIGS. 2 and 3 and disclosed herein above with the modifications disclosed herein below.

A phased array FMCW or step frequency radar according to the disclosed technique includes a receiver antenna unit and a transmitter antenna unit. The receiver antenna unit includes a plurality of receiving antenna elements and the transmitter antenna unit includes a plurality of transmitting antenna elements. The plurality of antenna elements may be arranged as shown in FIG. 3.

The phased array FMCW or step frequency radar allows transmitting and receiving radiation to and from multiple directions by using electronic tuning, as known in the art, by that enlarging the radar's field of view. Thus, the phased array radar allows for measuring variables such as distance, speed and/or acceleration of a target object at a specific direction with respect to the handheld electronic device.

In general, the radiation beam may be shaped electronically (i.e., without motion of mechanical parts) by relating spatial coordinates of the antennas elements to their relative delay (i.e. their phase) and weighting coefficient. The individual antenna elements may be spaced by a half wavelength ($\lambda$) from one another. A phase increment $\Delta\Phi$, which may be required from each antenna element, spaced by distance d, in order to steer the beam by angle α may be calculated by the following formula: $\Delta\Phi=360°\cdot d/\lambda\cdot\sin(\alpha)$. The control of the beam steering elements may be done digitally. Digital control signals may be generated by the handheld electronic device and supplied to the IC.

A transmitter (TX) unit of a phased-array radar according to the disclosed technique may include an external crystal oscillator, which may be used for generating a signal reference clock with a stable frequency that may be fed to a fractional N synthesizer. The synthesizer may be used for generating a chirp of frequency against time (for example in the form of a saw-tooth) or step frequency sequence. The fundamental frequency may be multiplied to the required millimeter wave band to be transmitted. A power amplifier (PA) may be used for raising a level of the transmitted signal. A phase shifter and an attenuator may be located between the PA and each antenna element. The phase shifters may be controlled individually for adding fixed amounts of delay (phase) to the initial phase. The attenuator may be controlled or weighted to shape a main beam and side lobes. The transmitted signal may be phase shifted and then distributed to all the TX antenna elements at once.

A receiver (RX) unit according to the disclosed technique may include an array of antenna elements with digitally controlled phase shifters. In addition, digitally controlled attenuators may be introduced for applying a weighting function that may improve main antenna beam and reduce side lobes. All the signals from all the antenna elements may be combined at an input of a low noise amplifier (LNA) and subsequently mixed with a reference signal from the TX. Before it may be sampled and converted to digital data, the output of a mixer may be processed by an anti-aliasing filter (AAF), adaptive analog gain control amplifier (AGC, may be used for exploiting the whole dynamic range) and driver buffer for an analog to digital converter's (ADC) input. The digital value may be transmitted and stored in a register of the controlling computer (e.g. a smartphone) in order for a fast Fourier transform (FFT) operation to be performed. The translation of the frequency information to distance (and speed) may be done by a dedicated software and according to well-known mathematical relations.

A dedicated software installed on the handheld electronic device may allow a user to select a direction at which a beam is transmitted by the phased array FMCW or step frequency radar (i.e., by the transmitter unit). The handheld electronic device may include an image sensor (e.g., a digital camera). The user may input the desired beam direction by using the image sensor. For example, the image stream generated by the image sensor may be displayed on a touch screen of the handheld electronic device. The phased array radar's field of view may be overlaid on the image, and the user may then select the direction of the target object to be scanned in an intuitive manner by tapping on the touch screen.

In some embodiments, calibration of the phased array FMCW or step frequency radar may be performed in order to compensate for changes that modify the behavior of the elements of the phased array radar over time. Hence the phased array radar's accuracy may be restored through calibration, e.g., before one performs any critical measurement.

In a manual calibration, the user may be required to identify an external reference object with a known measurable characteristic, e.g., distance, and to provide the known data to the handheld electronic device. The phased array FMCW or step frequency radar is then used to measure the reference object. The measurement data is then compared to the known data and the error is used to correct internal parameters.

In an electronic calibration, a branch derived from the LO signal is modulated by a switch and sequentially injected into the phase shifters of the RX, emulating the reception of a known signal without making any actual measurement. The signal is injected in the receiving elements one by one, by the means of switches. The received signal is sampled with respect to each receiving antenna element and the different results may allow tuning of the elements of the phased array.

Figure 4:
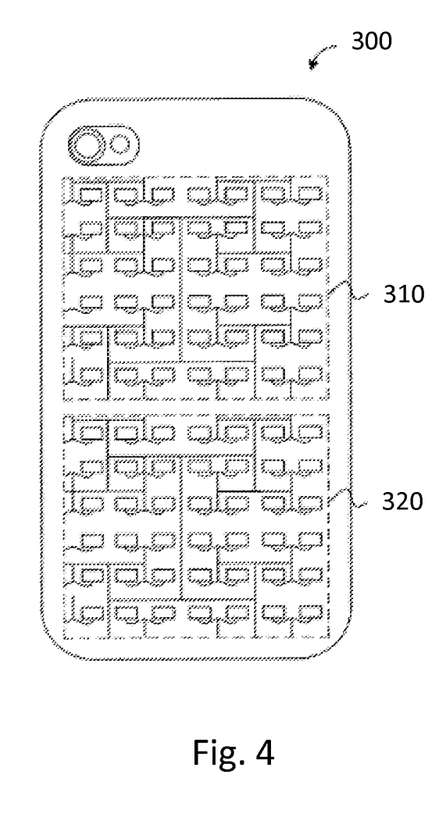
FIG. 4 shows a rear view of a handheld electronic device constructed and operative in accordance with another embodiment of the disclosed technique.

FIG. 4 shows an illustration of a rear view of a handheld electronic device 300 constructed and operative in accordance with another embodiment of the disclosed technique. Handheld electronic device 300 is integrated with a phased-array FMCW or step frequency radar according to the disclosed technique. Handheld electronic device 300 is similar and may operate similarly to a handheld electronic device mounted with add-on cover device 100 of FIGS. 2 and 3 with required modifications that will be disclosed herein below.

Handheld electronic device 300 includes an array of a plurality of receiving antenna elements 310 and an array of a plurality of transmitting antenna elements 320 that may be arranged on a back portion of it, as shown in FIG. 4. Arrays 310 and 320 may be covered by a casing. The IC module may be integrated with an IC of handheld electronic device 300.

Figure 5:
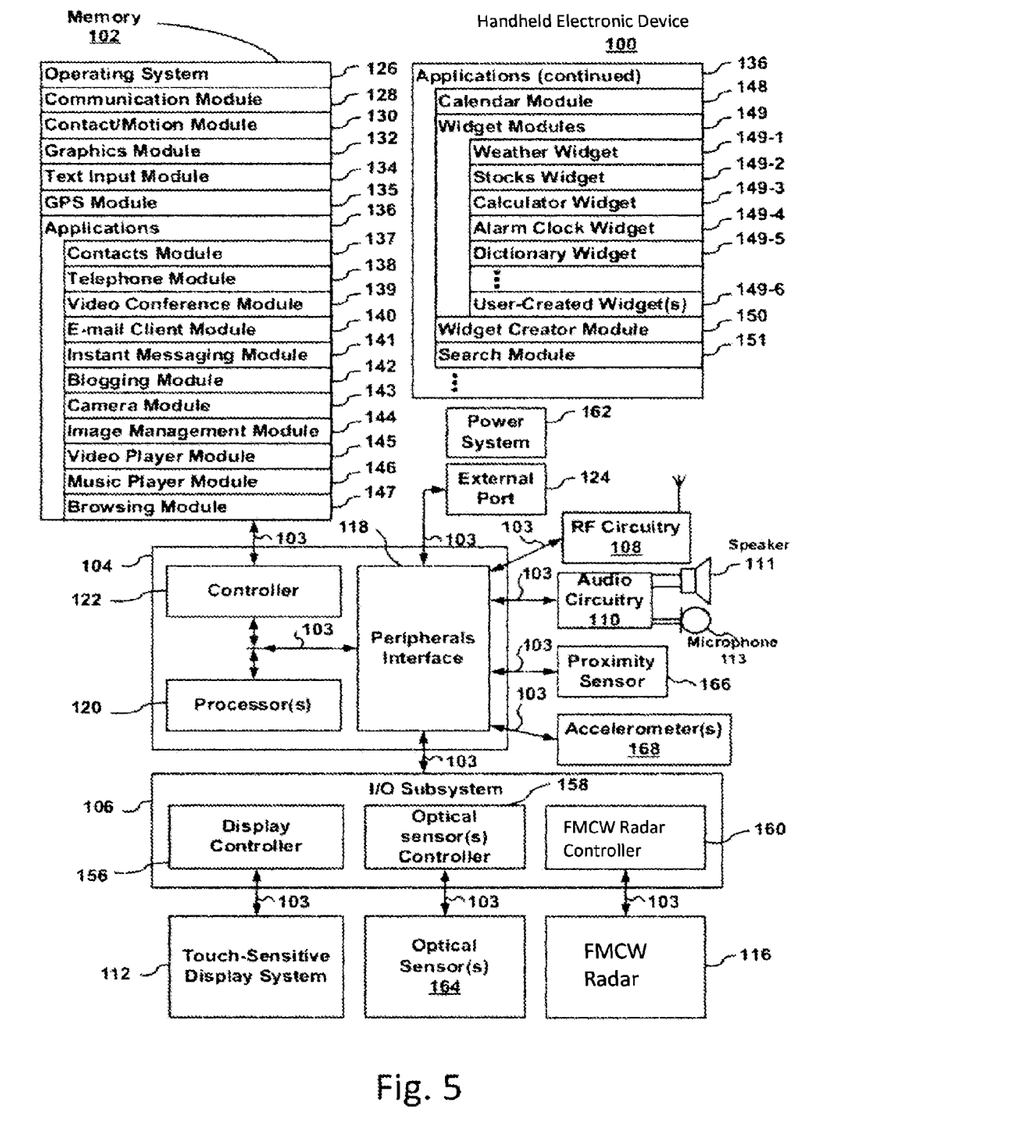
FIG. 5 shows a block diagram of a handheld electronic device operatively coupled with a radar, constructed and operative in accordance with yet another embodiment of the disclosed technique.

Reference is now made to FIG. 5, which shows an illustration of a block diagram of a handheld electronic device 100, operatively coupled with an FMCW or step frequency radar 116, constructed and operative in accordance with yet another embodiment of the disclosed technique. The radar 116 may be a phased-array radar. The radar 116 may be operatively coupled with handheld electronic device 100 by using an add-on cover device such as add-on cover device 200 of FIG. 2 or may be integrated with handheld electronic device 100, such as handheld electronic device 300 of FIG. 4.

Handheld electronic device 100 may include a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, FMCW or step frequency radar 116, and an external port 124. The device 100 may include one or more optical sensors 164. These components may communicate over one or more communication buses or signal lines 103. Communication buses or signal lines 103 may also include an interface unit such as interface unit 160 of FIG. 2.

It should be appreciated that the device 100 is only one example of a handheld electronic device 100, and that the device 100 may have more or fewer components than shown, may combine two or more components, or a may have a different configuration or arrangement of the components. The various components shown in FIG. 5 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices (not shown), to the peripherals interface 118. The I/O subsystem 106 may include a display controller 156 and one or more input controllers (not shown) for the other input or control devices. The one or more input controllers receive/send electrical signals from/to the other input or control devices. The other input/control devices may include physical buttons (e.g., push buttons, rocker buttons, etc.), dials, slider switches, joysticks, click wheels, and so forth. In some alternate embodiments, the input controller(s) may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device. A longer press of the push button may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semi-transparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more sensors such as optical sensors 164 and/or one or more FMCW or step frequency radars 116. FIG. 5 shows an optical sensor coupled to an optical sensor controller 158 and a radar 116 coupled to a radar controller 160 in I/O subsystem 106. The radar 116 is generally similar to the radars of FIG. 2, 3 or 4 with the modification disclosed herein. Alternatively, the radar 116 may be coupled to the peripherals interface 118.

The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 5 show a proximity sensor 166 coupled to the peripherals interface 118. Alternately, the proximity sensor 166 may be coupled to an input controller in the I/O subsystem 106. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 5 show an accelerometer 168 coupled to the peripherals interface 118. Alternately, the accelerometer 168 may be coupled to an input controller 160 in the I/O subsystem 106. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, Linux, Unix, OS X, Windows, Android or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, such as an amount of time between 0.2 and 1.0 seconds, or between 0.5 and 2.0 seconds, depending on the context.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof: a contacts module 137 (sometimes called an address book or contact list); a telephone module 138; a video conferencing module 139; an e-mail client module 140; an instant messaging (IM) module 141; a blogging module 142; a camera module 143 for still and/or video images; an image management module 144; a video player module 145; a music player module 146; a browser module 147; a calendar module 148; widget modules 149, which may include weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; video and music player module 152, which merges video player module 145 and music player module 146; notes module 153; map module 154; and/or an FMCW or step frequency radar module (not shown).

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102. Embodiments of user interfaces and associated processes using camera module 143 are described further below.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

Touch screen 112, display controller 156, FMCW or step frequency radar(s) 116, radar controller 160, graphics module 132, may be jointly used to direct the radar and to detect and visually indicate distance, speed and/or acceleration information of a target object. Alternatively or additionally, optical sensor(s) 164, optical sensor controller 158, camera module 143, and/or image management module may be used for this purpose.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

EXAMPLES

FMCW Radar

An FMCW radar used for the following two examples may have the following specifications. The FMCW radar is intended for operating at the center frequency of 78 Giga Hertz (GHz). The TX and RX units may have planar antennas that may occupy an area of 4 centimeters×4 centimeters each, which is substantially equivalent to (or smaller than) the back surface of most of today's smartphones. These two units may have gain GT (gain of transmitter antenna)=GR (gain of receiver antenna)~25 decibels (dB). The receiver has a noise figure (NF) which equals 8 dB. Interconnects and package losses may be less than 13 dB. One may use a relatively simple (slow) Analog to Digital (A2D) converter in the FMCW radar. A target located at azimuth position of 0° is considered. A minimum acceptable Signal to Noise Rate (SNR) may be chosen to be SNR=15 dB.

First Example

In the first example, the aim is to detect a moving person, or a target of equivalent size, in a distance range of 10 meters (m) to 25 m. The Radar Cross Section (RCS) corresponding to this target is RCS1=0 decibel relative to one square meter (dBsm). Measuring of the person's speed is also desired. The person's speed may be between 3.6 kilometer/hour (km/h) and 6.9 km/h A desired design of the FMCW radar may be according to the following specifications.
Transmitter:
Radiated power=−30 decibels per 1 milliwatt (dBm);
Chirp frequency f0=78 GHz with 3 GHz bandwidth;
Chirp time T=1 millisecond (msec);
Number of coherent chirps: 8;
Analog to Digital Convertor (ADC):
Sampling rate: 1024 KSPS (Kilo samples per second);
Fast Fourier Transform (FFT):
Number of bins of FFT1: N=1024;
Number of bins of FFT2: K=8.

The resulting performance may be a range accuracy of 5 cm and a velocity resolution of 0.24 msec with SNR=20 dB.

Second Example—FMCW Radar

Detecting of a hand motion or a target of equivalent size, in a distance range of 0.5 m to 2.5 m is now desired. The radar cross section (RCS) corresponding to the target is RCS2=−26 dBsm. Measuring of the motion speed, which may be between 36 km/h and 69 km/h, A desired design of the FMCW radar may be according to the following specifications.
Transmitter:
Radiated power=−45 dBm;
Chirp frequency f0=78 GHz with 3 GHz bandwidth;
Chirp time T=0.1 msec;
Number of coherent chirps: 8;
ADC:
Sampling rate: 1024 KSPS;
FFT:
Number of bins of FFT1: N=1024;
Number of bins of FFT2: K=8.

The resulting performance may be a range accuracy of 5 cm and a velocity resolution of 2.4 msec.

Third Example—Phased-Array FMCW Radar

Scanning of the contents of a box (or a purse) is desired. The device design may be done for a linear array for simplicity, but it may be extended to a full 2D scan by using the same design considerations. The aim is to scan by the means of a phased-array FMCW radar a box having size of 30 centimeters (cm) with a spatial resolution of 10 millimeters (mm). The detected object is not moving appreciably (<1 km/h), and it is located at a distance of 30 cm from the phased-array FMCW radar. The radar cross section (RCS) is of the order of RCS3=−20 dBsm.

The phased-array FMCW radar may be configured to operate at the center frequency of 120 GHz. The transmitter unit and the receiver unit use planar antennas having length of 5 cm; each antenna has 40 elements with 1.25 mm pitch and 1.15 mm size These two antennas have gain GT=GR~25 dB. The receiver may have a noise figure NF=20 dB. The total losses, including interconnects and package, as well as transmittance through the box, are 40 dB. The minimum acceptable signal to noise rate may be set to be SNR=15 dB.

Device Design:

The phased array has to perform a sweep of 30 cm with 1 cm step size (or less), which defines the angle of 2.55° for each step, and henceforth defines the required phase shift of each element of the phased array by using a well known formula.

A desired design of the phased-array FMCW radar may be according to the following specifications.

Transmitter:
Radiated power=−20 dBm;
Chirp frequency f0=120 GHz with 15 GHz bandwidth;
Chirp time T=1 msec;
ADC:
Sampling rate: 1024 KSPS;
Sweep:
Number of measurement steps: N=30;
Sweep time: t=30 msec.

The resulting performance may be a range accuracy of 10 mm and a velocity resolution of 1.25 msec with SNR=30 dB. Note: in order to scan the contents of a box with this system, the user will be required to repeat the scan at any desired position line by line (orthogonally to the direction of the electronic scan), because the phased array is linear.

Thus, the requirements outlined in the three examples above may be implemented with an integrated silicon electronic circuit. The range and speed accuracy may be satisfactory for various applications. Furthermore, the low power requirements and the compact size of a planar TX-RX (i.e., transmission-reception) antennas may allow such radars to be suitable for integration with portable electronic devices such as smartphones and tablets The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A handheld electronic device comprising an image sensor, a screen, and a step frequency radar, the step frequency radar comprising:
   a receiver unit comprising at least one receiving antenna element;
   a transmitter unit comprising at least one transmitting antenna element; and
   an integrated circuit (IC) module,
   wherein the handheld electronic device is configured to:
      display one or more images generated by said image sensor on said screen,
      receive a user selection of a desired beam direction of said step frequency radar,
      steer the beam of said step frequency radar in accordance with the user selection, by communicating with said IC module of the step frequency radar.

2. The handheld electronic device of claim 1, wherein the at least one receiving antenna element is a plurality of receiving antenna elements, and the at least one transmitting antenna element comprises a plurality of transmitting antenna elements, and wherein:
   the plurality of transmitting antenna elements is arranged in an array facing at least a first portion of a back surface of the handheld electronic device; and
   the plurality of receiving antenna elements is arranged in an array facing at least a second portion of the back surface of the handheld electronic device.

3. The handheld electronic device of claim 1, wherein the step frequency radar is configured to measure at least one variable selected from the group consisting of: distance, speed and acceleration of a target object with respect to the handheld electronic device.

4. The handheld electronic device of claim 3, wherein said handheld electronic device is further configured to:
   display the target object in said one or more images, and
   instruct the step frequency radar to measure the at least one variable based on the user selection, wherein the user selection is associated with the target object.

5. The handheld electronic device of claim 1, wherein the step frequency radar is a phased array step frequency radar.

6. The handheld electronic device of claim 5, wherein a reference object is measured by the phased array step frequency radar and the data obtained by the measurement is compared to data provided by a user, and wherein the phased array step frequency radar is calibrated based on the comparison.

7. The handheld electronic device of claim 5, wherein the handheld electronic device further comprises one or more switches configured to emulate reception of a signal by each of said plurality of receiving antenna elements, and wherein a calibration of the phased array step frequency radar is performed based on sampling of the received signal with respect to each of said plurality of receiving antenna elements.

* * * * *